3,218,171
GROWTH-PROMOTING COMPOSITION AND METHOD OF USING SAME

Harold M. Taylor, Indianapolis, Ind., assignor to Eli Lilly and Company, Indianapolis, Ind., a corporation of Indiana
No Drawing. Filed Oct. 11, 1961, Ser. No. 144,314
3 Claims. (Cl. 99—2)

This invention relates to nonhormonal compositions for increasing the growth rate and weight gain of animals and to methods of using these compositions for such purpose. In particular, this invention relates to methods and growth-promoting compositions having utility in growing and fattening beef cattle and sheep by producing high-quality meat at an accelerated rate with a reduced amount of feed.

At present the most important commercial growth promoter is diethylstilbestrol. This material is a hormone, in particular an estrogen, which, quite unexpectedly, does not produce the inherent, undesirable side effects of estrogenic substances—provided the diethylstilbestrol is administered to animals in proper dosages. Based on this finding, diethylstilbestrol was approved by the Food and Drug Administration for use as a growth promoter in 1954, but, unfortunately, is the only estrogenic growth promoter which has received such approval. Hence, a great expenditure of research effort has been directed to finding non-estrogenic growth stimulators. Antibiotics have provided the most fruitful area of research; however, none have achieved the commercial significance of diethylstilbestrol.

An object of this invention is to provide, for the first time, a growth-promoting composition containing a nonestrogenic, nonantibiotic growth-promoting active constituent which has an activity approximately equal to diethylstilbestrol. Another object of this invention is to provide a method for increasing the growth rate and weight gain in animals—in particular, beef cattle and sheep. A further object of this invention is to promote growth without causing undesirable physiological side effects and, at the same time, produce at least as good, if not superior, quality meat as that produced in the absence of treatment. Another object of this invention is to provide a method for producing growth-promoting compositions. These and other objects of this invention appear more fully hereinafter.

In accordance with the present invention there is provided a composition, suitable for administering to an animal, wherein the improvement comprises employing in said composition a growth-promoting quantity (i.e., a physiologically adequate portion) of 4,4'-dihydroxydiphenylsulfide. Although the growth-promoting compositions of this invention can be administered by implantation or by injection, in general, the compositions are administered orally, and thus preferably comprise a major proportion of an ingestible carrier material and a minor, but physiologically adequate, proportion of 4,4'-dihydroxydiphenylsulfide. The ingestible carrier can be (1) a complete ration, i.e., an animal feed nutritionally adequate per se; (2) an animal feed supplement; or (3) a nutrient. Thus, for example, 4,4'-dihydroxydiphenylsulfide can be administered or combined with any of the usual animal feeds or feed supplements in such amount that it is present in the feed or supplement in an amount of about 1 to 20 grams per ton—preferably about 2 to 10 grams per ton. The administration of 4,4'-dihydroxydiphenylsulfide to animals in physiologically adequate amounts exerts a growth-promoting action through greater feed consumption and improved appetite in conjunction with more efficient feed utilization and a concomitant conversion of feed to rate of growth and weight gain.

The compositions of this invention have the particular advantage of being nonestrogenic substances. Hence, it is possible to administer these compounds over a broad range of dosages to achieve the desired growth-promoting characteristics without fear of producing the inherent, undesirable side effects experienced in estrogenic substances, such as excessive sexual stimulation, including mammary development and lactation, as well as other undesirable physiological side effects, such as lowering of meat quality.

The fact that 4,4'-dihydroxydiphenylsulfide stimulates growth in animals approximately equal to diethylstilbestrol is highly unexpected, since the growth stimulation of diethylstilbestrol has popularly been thought to be due wholly to its estrogenic activity. Based on this theory, it is most unusual that a nonestrogen, such as 4,4'-dihydroxydiphenylsulfide, exhibits such high growth-promoting activity.

An embodiment of this invention is a method of growing and fattening animals which generally comprises orally administering the growth-promoting compositions of this invention to the animals at spaced intervals of time and regulating the quantities of feed composition to accelerate the rates of weight gained. In this manner, more meat can be produced in the same time using a reduced amount of feed without impairing the quality of the meat. Thus, the process of this invention comprises administering a composition containing 4,4'-dihydroxydiphenylsulfide in growth-promoting quantities to an animal.

The growth-promoting compositions of this invention have applicability to a wide number of animals, such as dogs, cats, and horses, but, naturally, are of greatest significance with respect to those animals of economic importance, as, for example, swine, ruminants, and poultry. It is preferred that the animals be ruminants because of their great commercial importance.

The following examples, in which all parts and percentages are by weight, further demonstrate this invention. In Examples I and II, nutritionally adequate per se feed rations were employed. These animal feeds are hereinafter designated as lamb basal rations and are further characterized by the letter designations "A" and "B." Tables I and II set forth the compositions of basal rations A and B.

TABLE I.—LAMB BASAL RATION A

| Ingredient | Percent of Ration | Pounds Per Ton |
|---|---|---|
| Corn, Yellow | 31.00 | 620 |
| Cobs, Corn | 37.50 | 750 |
| Alfalfa Meal, Dehydrated 17 Percent | 11.00 | 220 |
| Soybean Oil Meal, Solvent Extracted Dehulled 50 Percent | 7.75 | 155 |
| Cottonseed Meal, Solvent Extracted 41 Percent | 1.75 | 35 |
| Urea, Feeding Grade | .52 | 10.50 |
| Distillers Dried Grains with Solubles (Corn) | 1.75 | 35 |
| Molasses, Cane | 7.50 | 150 |
| Dicalcium Phosphate, Feed Grade | .53 | 10.50 |
| Calcium Carbonate | .35 | 7 |
| Salt (NaCl) | .35 | 7 |
| Minerals (Trace)[1] | .06 | 1.125 |
| Vitamin D₂ Premix[2] | .05 | 1 |
| Total | 100.11 | 2,002.125 |

See footnotes at end of Table II.

TABLE II.—LAMB BASAL RATION B

| Ingredient | Percent of Ration | Pounds Per Ton |
|---|---|---|
| Corn, Yellow | 56.00 | 1,120 |
| Cobs, Corn | 20.00 | 400 |
| Alfalfa Meal, Dehydrated 17 Percent | 3.00 | 60 |
| Soybean Oil Meal, Solvent Extracted Dehulled 50 Percent | 6.50 | 130 |
| Cottonseed Meal, Solvent Extracted 41 Percent | 1.50 | 30 |
| Urea, Feeding Grade | .45 | 9 |
| Distillers Dried Grains with Solubles (Corn) | 1.50 | 30 |
| Molasses, Cane | 10.00 | 200 |
| Dicalcium Phosphate, Feed Grade | .45 | 9 |
| Calcium Carbonate | .30 | 6 |
| Salt (NaCl) | .30 | 6 |
| Minerals (Trace) [1] | .06 | 1.125 |
| Vitamin $D_2$ Premix [2] | .05 | 1 |
| Total | 100.11 | 2,002.125 |

[1] CCC Trace Mineral Premix contains: 12.20 percent manganese as manganese sulfate, 0.38 percent iodine as potassium iodide, 0.26% cobalt as cobalt sulfate, 9.60 percent iron as ferrous sulfate and ferrous carbonate and red iron oxide (for color), 0.73 percent copper as copper carbonate, 5.00 percent zinc as zinc sulfate and zinc oxide, and 6.38 percent calcium as calcium carbonate.

[2] Each pound contains 510,000 U.S.P. units vitamin $D_2$. Premix made by adding one pound of 64,000,000 U.S.P. units per pound irradiated yeast to 125 pounds of soybean feed.

*Example I*

This example compares the effects on growth rate and feed efficiency of lambs receiving a nutritionally adequate per se basal ration (negative control), and lambs receiving said ration containing diethylstilbestrol (positive control), with lambs receiving ration containing the growth-promoting ingredient of this invention, 4,4'-dihydroxydiphenylsulfide.

The feeding procedure employed an experimental design of the block design type, utilizing a randomization method of allotment. The lambs employed were seven-month, Black-faced Texas wethers. (Each lamb was fed for a two-week conditioning period and then weighed, identified, and drenched with two ounces of phenoarsenate.) These lambs were divided into five lots of ten lambs each, and one lot containing nine lambs. In the negative control, two lots of ten lambs each were fed basal ration A for eight days and basal ration B for the durations (see Tables I and II for the composition of basal rations A and B). The positive control comprised two lots of ten lambs each, which were fed basal ration A plus 2 mg. per head per day of diethylstilbestrol for eight days, and basal ration B plus 2 mg. per head per day for the duration of the test period. Additionally, two lots of ten and nine lambs each were fed basal ration A plus 2 mg. per head per day of 4,4'-dihydroxydiphenylsulfide for eight days, and basal ration B plus 2 mg. per head per day of 4,4'-dihydroxydiphenylsulfide for the duration. The total test period was 56 days. The results of the experiment are set forth in Table III.

Thus, in Example I, 4,4'-dihydroxydiphenylsulfide in feed at levels of 2 mg. per head per day improved rate of gain 18.5 percent, when compared to the negative control, basal ration (0.54 vs. 0.44 pound), and was 5.5 percent better than diethylstilbestrol (0.54 vs. 0.51 pound). Feed efficiency (feed/lb. gain) was improved 12.8 percent, when compared to the negative control (6.50 vs. 7.46 pounds of feed per pound of gain), and was practically equal to diethylstilbestrol (6.49 vs. 6.50 pounds of feed per pound of gain).

*Example II*

This experiment compares the effects of growth rate and feed efficiency of lambs receiving lamb ration B (negative control) and lamb ration B plus diethylstilbestrol (positive control) with lambs receiving lamb ration B plus 4,4'-dihydroxydiphenylsulfide. The procedure of Example I was employed with the exception that the basal ration consisted of lamb ration B for the entire test period of 47 days and all lots contained ten lambs each. Results of this experiment are summarized in Table IV.

TABLE IV

| | No. Animals | Days Fed | Av. Daily Gain, Lbs. | Feed Efficiency |
|---|---|---|---|---|
| Negative Control [1] | 20 | 47 | 0.48 | 7.84 |
| Positive Control [2] | 20 | 47 | 0.53 | 6.74 |
| Test Material [3] | 20 | 47 | 0.55 | 6.82 |

[1] Basal ration.
[2] Basal ration plus diethylstilbestrol.
[3] Basal ration plus 4,4'-dihydroxydiphenylsulfide.

It can be seen from Example II that 4,4'-dihydroxydiphenylsulfide in feed at levels of 2 mg. per head per day improved rate of gain 13 percent, when compared to the negative control, basal ration (0.55 pound vs. 0.48 pound), and was closely equal to diethylstilbestrol (0.55 pound vs. 0.53 pound). Feed efficiency was improved 13 percent, when compared to the negative control (6.82 vs. 7.84 pounds of feed per pound of gain), and was also practically equal to diethylstilbestrol (6.82 pounds vs. 6.74 pounds of feed per pound of gain).

Likewise, in experiments on cattle, 4,4'-dihydroxydiphenylsulfide, when employed in concentrations of 5, 10, and 50 mg. per head per day, significantly improved rate of gain, when compared to the negative control. Typical basal cattle rations employed in cattle feed experiments are set forth in Tables V and VI.

TABLE III

| Treatment | No. Animals | Total Animal Days | Total Initial Wt., Lbs. | Av. Initial Wt., Lbs. | Total Final Wt., Lbs. | Av. Final Wt., Lbs. | Total Gain, Lbs. | Av. Gain, Lbs. | Av. Daily Gain, Lbs. | Total Feed, Lbs. | Av. Daily Fd., Lbs. | Feed/lb. Gain |
|---|---|---|---|---|---|---|---|---|---|---|---|---|
| Negative Control [1] | 10 | 560 | 675 | 67.5 | 882.0 | 88.2 | 207.0 | 20.7 | .37 | 1,691 | 3.0 | 8.17 |
| | 10 | 560 | 673 | 67.3 | 957.5 | 95.8 | 284.5 | 28.4 | .51 | 1,975 | 3.5 | 6.94 |
| | 20 | 1,120 | 1,348 | 67.4 | 1,839.5 | 92.0 | 491.5 | 24.55 | .44 | 3,666 | 3.3 | 7.46 |
| Positive Control [2] | 10 | 560 | 674 | 67.4 | 986.5 | 98.6 | 312.5 | 31.2 | .56 | 1,906 | 3.4 | 6.10 |
| | 10 | 560 | 673 | 67.3 | 935.5 | 93.6 | 262.5 | 26.2 | .47 | 1,827 | 3.3 | 6.96 |
| | 20 | 1,120 | 1,347 | 67.35 | 1,922.0 | 96.1 | 575.0 | 28.7 | .51 | 3,733 | 3.4 | 6.49 |
| Test Material [3] | 10 | 560 | 676 | 67.6 | 1,013.5 | 101.4 | 337.5 | 33.8 | .60 | 2,107 | 3.8 | 6.24 |
| | 9 | 504 | 604 | 67.1 | 840.0 | 93.3 | 236.0 | 26.2 | .47 | 1,621.9 | 3.2 | 6.87 |
| | 19 | 1,064 | 1,280 | 67.35 | 1,853.5 | 97.35 | 573.5 | 30.0 | .54 | 3,728.9 | 3.5 | 6.50 |

[1] Basal ration.
[2] Basal ration plus diethylstilbestrol.
[3] Basal ration plus 4,4'-dihydroxydiphenylsulfide.

TABLE V.—CATTLE RATION NO. 1

| Ingredient | Percent | Lbs./Ton |
|---|---|---|
| Corn, Yellow | 41.00 | 820 |
| Cobs, Corn | 35.00 | 700 |
| Alfalfa Meal, Dehydrated 17 Percent | 3.00 | 60 |
| Soybean Oil Meal, Solvent Extracted Dehulled 50 Percent | 6.50 | 130 |
| Cottonseed Meal, Solvent Extracted 41 Percent | 1.50 | 30 |
| Urea, Feeding Grade | .45 | 9 |
| Distillers Dried Solubles (Corn) | 1.50 | 30 |
| Molasses, Cane | 10.00 | 200 |
| Dicalcium Phosphate, Feed Grade | .45 | 9 |
| Calcium Carbonate | .30 | 6 |
| Salt (NaCl) | .30 | 6 |
| Minerals (Trace)[1] | .05 | 1 |
| Vitamin A and $D_2$ Premix[2] | .05 | 1 |
| Total | 100.10 | 2002 |

See footnotes at end of Table VI.

TABLE VI.—CATTLE RATION NO. 2

| Ingredient | Percent | Lbs./Ton |
|---|---|---|
| Corn, Yellow | 61.00 | 1,220 |
| Cobs, Corn | 20.00 | 400 |
| Alfalfa Meal, Dehydrated 17 Percent | 3.00 | 60 |
| Soybean Oil Meal, Solvent Extracted Dehulled 50 Percent | 6.50 | 130 |
| Cottonseed Meal, Solvent Extracted 41 Percent | 1.50 | 30 |
| Urea, Feeding Grade | .45 | 9 |
| Distillers Dried Solubles (Corn) | 1.50 | 30 |
| Molasses, Cane | 5.00 | 100 |
| Dicalcium Phosphate, Feed Grade | .45 | 9 |
| Calcium Carbonate | .30 | 6 |
| Salt (NaCl) | .30 | 6 |
| Minerals (Trace)[1] | .05 | 1 |
| Vitamin A and $D_2$ Premix[2] | .05 | 1 |
| Total | 100.10 | 2,002 |

[1] CCC Trace Mineral Premix contains: 10.00 percent manganese as manganese sulfate, 0.30 percent iodine as potassium iodide, 0.10 percent cobalt as cobalt carbonate, 6.00 percent iron as ferrous carbonate, 1.00 percent copper as copper oxide, 10.00 percent zinc as zinc sulfate and zinc oxide, and 11.50 percent maximum and 8.50 percent minimum calcium as calcium carbonate.

[2] Each pound contains 2,000,000 I.U./lb. vitamin A and 227,200 I.U./lb. vitamin $D_2$.

In general, the procedure employed in feeding cattle follows the method set forth in Example I for feeding sheep with the exception that an experimental design of the randomized block type is employed, and the method of allotment is stratification by weight with random assignment to treatment groups according to weight and gain during a conditioning period. The cattle employed are steers—generally Herefords. Each steer is fed for a two-week period on a conditioning ration. The steers are then divided into lots. Each lot is then fed the negative control basal ration. In most cases, a basal ration of the type set forth in Table V is fed for the first 56 days and then a basal ration similar to that set forth in Table VI is fed for the duration of the feeding period. Another lot is fed the same basal rations plus a specified amount of 4,4'-dihydroxydiphenylsulfide in a similar fashion. The total test period is generally 168 days.

The growth-promoting active ingredient, 4,4'-dihydroxydiphenylsulfide, can be administered orally by first combining a very small quantity of 4,4'-dihydroxydiphenylsulfide with an animal feed or feed supplement which is adapted for use in feeding the particular animal, as, for example, a cattle or sheep feed supplement. On growing and fattening beef cattle, a prepared supplement can be fed to the animals. This supplement typically is about 10 percent by weight of the food consumed by the animals per day. Such a prepared feed supplement provides a convenient vehicle for the administration of the active growth-promoting ingredient, 4,4'-dihydroxydiphenylsulfide, in accordance with this invention. However, it is to be understood that, if desired, 4,4'-dihydroxydiphenylsulfide can be incorporated in a complete ration; that is, one nutritionally adequate per se; in other nutrient materials consumed by the animal; in the animal's liquid needs, as, for example, in his water; or in any ingestible nontoxic, inert carrier material.

Because of the nonhormonal and nonantibiotic character of 4,4'-dihydroxydiphenylsulfide, it is possible to administer this compound to animals over a wide range of dosage levels. Although no undesirable effects have been indicated at high-dosage levels, it has been found that dosage levels ranging from about 2 to about 20 grams per ton of the ingestible carrier material (e.g., animal feed or animal feed supplement) produce excellent results. For economic reasons, its is desirable to maintain dosage levels as low as is compatible with maximum growth stimulation. Therefore, it is preferred to employ dosage levels of no greater than 10 grams per ton of ingestible carrier.

4,4'-dihydroxydiphenylsulfide, in practicing this invention, can conveniently be administered to the growing animal in dosages based on body weight. Generally, dosages of about 0.1 to 10 mg. per 100 pounds of body weight during each 24-hour period of treatment (or at least the average dosage per day falls within this range over each 5- to 10-day period of treatment) are given. Higher dosages have not been found to be detrimental; however, economics dictate that as small a dosage of 4,4'-dihydroxydiphenylsulfide should be employed as is compatible with maximum growth stimulation. For this reason, it is preferred to employ a dosage ranging from about 0.1 to about 5 mg. of 4,4'-dihydroxydiphenylsulfide per 100 pounds of body weight over each 24-hour period.

On the basis of feed intake, when 4,4'-dihydroxydiphenylsulfide is incorporated in the total feed ration (that is, in an animal feed nutritionally adequate per se), the feed material generally can contain from about 0.01 to about 8 mg. per pound of feed material. However, it is preferred to employ from about 0.1 to about 5 mg. per pound of feed material.

A feed supplement can be employed as the vehicle for administering 4,4'-dihydroxydiphenylsulfide to an animal, as, for example, beef cattle or sheep. The following is illustrative of such a composition. The feed supplement can be composed principally of soybean meal and/or other seed meal and alfalfa meal, molasses, minerals, and vitamins. Such supplements are referred to in the trade as protein supplements. The growth-promoting ingredient, 4,4'-dihydroxydiphenylsulfide, is readily incorporated in feed supplements by first dissolving the active compound in a vegetable oil, such as cottonseed oil or soybean oil. For example, 10 grams of 4,4'-dihydroxydiphenylsulfide can be dissolved in about 225 grams of oil. The oil solution is then premixed with a measured amount of the feed supplement and, thereafter, the premixed material mixed with the whole body of a measured amount of feed supplement. For example, the above oil solution could be premixed with nine and one-half pounds of supplement and, thereafter, with enough of the supplement to produce a 2,000 pound batch. Such growth-promoting supplements can be fed in various ways; for example, as a top dressing for the complete feed ration or in mixture therewith.

The animal feeds utilized in this invention comprise a basal ration of which a wide variety are offered for the feeding of farm animals. However, there is no universally accepted basal ration formula. In 1950 the National Research Council released recommended minimum nutrient allowances for the early life stages of chicks, poults, pigs, calves, lambs and other farm animals, which nutrients, both in kind and in quantity, are not arbitrarily fixed but are intended to be varied with considerable latitude based on the experience of the producer and user of such feeds.

In order to make pre-eminently clear what is meant by the term "animal feed," the following is given by way of illustration of a basal ration:

Two classes of nutrients are normally constituents of any basal ration of animal feeds and are here referred to as:

A. *Essential constituents*, which comprise two classes of nutrients, both of which are recognized as necessary in any basal ration of animal feeds. All such approved basal feeds contain ingredients selected from each of these two classes:

(1) *Plant ingredients* which normally constitute from 85 percent to as high as 95 percent by weight of the basal ration and include one or more of the following: corn meal, soybean oil meal, wheat bran, wheat middlings, dehydrated alfalfa meal, ground oats and oat grouts, millet, linseed oil meal, cocoanut oil meal, distillers' dried grains, and the like ground plant products;

(2) *Mineral ingredients* which are normally incorporated in the feed in very small amounts of around 1 to 5 percent by weight of the basal ration and include one or more of the following: salts of calcium, phosphorous, manganese, and common salt (NaCl), as well as minute proportions of one or more of the salts of iodine, potassium, magnesium, iron, copper, and the like.

B. *Ancillary constituents*, which are optionally added to animal feeds and are alleged to impart to the feeds to which they are added higher nutritional values, and which are here classified as:

(3) *Animal ingredients*, which may comprise up to as high as 10 percent by weight of the basal ration, although used normally in such smaller amounts, and include fish meal, ground meat scraps, animal fats, dried whey solubles and the like, although it is to be understood that many highly recommended animal feeds contain only minute or no animal ingredients;

(4) *Vitamin ingredients*, which are added to some, but not all, basal rations in small amounts and include one or more of the vitamins A, $B_{12}$, D and K, as well as materials containing the B vitamins, such as riboflavin, niacin, pantothenic acid or salts thereof, choline, pyridoxine, thiamine, nicotinic acid or salts thereof, biotin, folic acid and the like; and (5) *Amino acid ingredients*, which are sometimes, but not generally, added to animal feeds in very small amounts and include methionine, phenylalanine, arginine, glycine, histidine, isoleucine, leucine, lysine, threonine, tryptophan, valine and the like.

The term "animal feed" as used in the specification and claims of this application is to be understood to include any basal ration containing ingredients as hereinbefore described.

I claim:

1. The method of growing and fattening dogs, cats, horses, swine, ruminants, and poultry, which comprises orally administering 4,4'-dihydroxydiphenylsulfide to one or more of said animals at spaced intervals of time and regulating the quantities of said sulfide to accelerate the rates of weight gained; the amount of 4,4'-dihydroxydiphenylsulfide administered ranging from about 0.01 to about 10 mg. of 4,4'-dihydroxydiphenylsulfide per 100 pounds of body weight for each 24-hour period.

2. The method of claim 1, wherein said animals are ruminants.

3. A growth-promoting composition comprising a major proportion of an ingestible carrier material and a minor proportion of 4,4'-dihydroxydiphenylsulfide, said composition being adapted to being used as at least part of a feed for animals and, when ingested in normal quantities, to supply 4,4'-dihydroxydiphenylsulfide in an amount ranging from about 0.01 to about 10 mg. per 100 pounds of body weight for each 24-hour period.

References Cited by the Examiner

UNITED STATES PATENTS 2,751,303  5/1956  Burroughs _____ 99—2

OTHER REFERENCES

Amano, Chem. Abst., volume 47, 1953, page 1845b.

Chatten, Chemical Abstract, volume 45, 1951, pages 3916i and 3917a.

Pincus, The Hormones, volume 1, 1948, Academic Press, New York, N.Y., pages 341–347.

Pincus, The Hormones, volume III, 1955, Academic Press, New York, N.Y., pages 666–668.

Schmahl, Chem. Abst., volume 51, 1957, page 12348f.

Sykes, Hormonal Relationships and Applications, March 1953, National Research Council, Washington, D.C., pages 5 to 14.

JULIAN S. LEVITT, *Primary Examiner.*

MORRIS O. WOLK, FRANK CACCIAPAGLIA, JR.,
*Examiners.*